D. MILLER.
Drag.

No. 168,516.

Patented Oct. 5, 1875.

WITNESSES:
W. W. Hollingsworth

INVENTOR:
David Miller
BY
ATTORNEYS.

UNITED STATES PATENT OFFICE.

DAVID MILLER, OF CARROLLTON, MARYLAND.

IMPROVEMENT IN DRAGS.

Specification forming part of Letters Patent No. 168,516, dated October 5, 1875; application filed September 1, 1875.

*To all whom it may concern:*

Be it known that I, DAVID MILLER, of Carrollton, in the county of Carroll and State of Maryland, have invented a new and Improved Drag; and I do hereby declare that the following is a full, clear, and exact description of the same, reference being had to the accompanying drawing, forming a part of this specification, in which—

Figure 1:
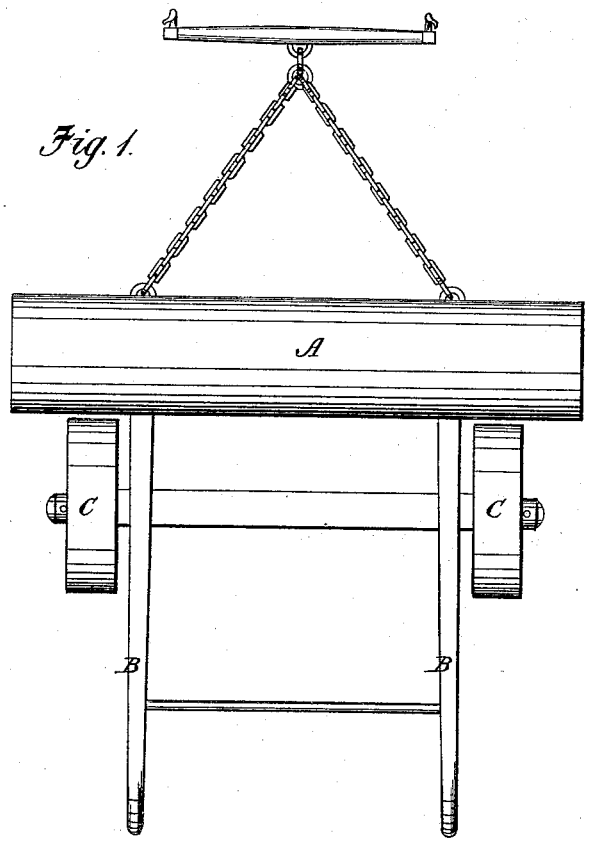
Figure 2:
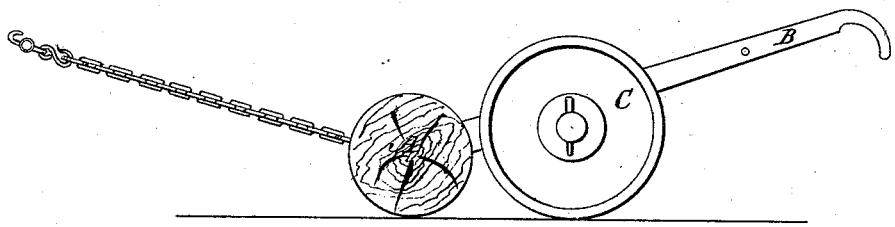

Figure 1 is a plan view; Fig. 2, a side elevation.

This invention relates to certain improvements in that class of drags in which a single log or cylinder of wood is provided with draft attachments, and is drawn laterally across the field for the purpose of crushing and pulverizing the clods, and leveling the surface of the ground.

My invention consists in the combination, with such a drag, of a pair of handles rigidly attached thereto, and projecting to the rear, provided with a pair of wheels, upon which, as a fulcrum, the drag may be raised from the ground by bearing upon the handles, so as to avoid stumps and stones, and facilitate the turning of the corners at the end of the row; the said wheels and handles serving also to prevent the drag from rolling under the horses' heels when going down a hill.

In the drawings, A represents the log of wood, which may be of any suitable size and weight, and which is provided in front with staples or other draft attachments, to which is attached a sling composed of a rope or chain. To the rear portion of the log is fastened the pair of handles B, which may be let into holes bored into the log, or fastened in any other suitable way. To the said handles just in the rear of the log are attached the wheels C, which may be journaled upon one and the same axle, or in independent standards.

Now, as the log is dragged across the ground, instead of being obliged to turn aside to avoid a stump or stone the log is lifted, so as to pass over the same, by simply pressing upon the handles, which throws the weight of the log upon the wheels. In turning corners also, in which the log would be likely to get out of position, and cause much awkwardness and embarrassment, the log is lifted in the same manner, and, being supported then upon wheels, the drag may be turned and transported as easily as any other wheeled vehicle.

Having thus described my invention, what I claim as new is—

The combination, with the log A forming the drag, of a pair of rearwardly-projecting handles, having wheels attached thereto, for the purpose of lifting and transporting the drag, substantially as described.

The above specification of my invention signed by me this 14th day of August, 1875.

DAVID MILLER.

Witnesses:
 SOLON C. KEMON,
 CHAS. A. PETTIT.